(12) United States Patent
Jiao et al.

(10) Patent No.: US 11,999,910 B2
(45) Date of Patent: *Jun. 4, 2024

(54) CATALYST AND METHOD FOR PREPARING LOW AROMATIC HYDROCARBON LIQUID FUEL THROUGH DIRECT CONVERSION OF SYNGAS

(71) Applicant: DALIAN INSTITUTE OF CHEMICAL PHYSICS, CHINESE ACADEMY OF SCIENCES, Dalian (CN)

(72) Inventors: Feng Jiao, Dalian (CN); Na Li, Dalian (CN); Xiulian Pan, Dalian (CN); Xinhe Bao, Dalian (CN)

(73) Assignee: DALIAN INSTITUTE OF CHEMICAL PHYSICS, CAS, Dalian (CN)

( * ) Notice: Subject to any disclaimer, the term of this patent is extended or adjusted under 35 U.S.C. 154(b) by 558 days.

This patent is subject to a terminal disclaimer.

(21) Appl. No.: 17/287,084

(22) PCT Filed: Dec. 10, 2019

(86) PCT No.: PCT/CN2019/124235
§ 371 (c)(1),
(2) Date: Apr. 20, 2021

(87) PCT Pub. No.: WO2020/125488
PCT Pub. Date: Jun. 25, 2020

(65) Prior Publication Data
US 2021/0380888 A1    Dec. 9, 2021

(30) Foreign Application Priority Data

Dec. 21, 2018 (CN) .......................... 201811575053.0

(51) Int. Cl.
| | |
|---|---|
| B01J 29/70 | (2006.01) |
| B01J 29/72 | (2006.01) |
| B01J 29/76 | (2006.01) |
| B01J 29/78 | (2006.01) |
| B01J 35/61 | (2024.01) |
| B01J 37/00 | (2006.01) |
| C10G 2/00 | (2006.01) |

(52) U.S. Cl.
CPC ............ *C10G 2/334* (2013.01); *B01J 29/703* (2013.01); *B01J 29/7042* (2013.01); *B01J 29/7046* (2013.01); *B01J 29/7261* (2013.01); *B01J 29/7284* (2013.01); *B01J 29/7292* (2013.01); *B01J 29/7661* (2013.01); *B01J 29/7684* (2013.01); *B01J 29/7692* (2013.01); *B01J 29/7861* (2013.01); *B01J 29/7884* (2013.01); *B01J 29/7892* (2013.01); *B01J 35/612* (2024.01); *B01J 35/613* (2024.01); *B01J 35/615* (2024.01); *B01J 37/0018* (2013.01); *B01J 2229/18* (2013.01); *C10G 2300/4006* (2013.01); *C10G 2300/4012* (2013.01); *C10G 2300/4018* (2013.01); *C10G 2400/30* (2013.01)

(58) Field of Classification Search
CPC ........ C10G 2400/30; C10G 2300/4006; C10G 2300/4012; C10G 2300/4018; B01J 2229/18; B01J 37/0018; B01J 29/703; B01J 29/7042; B01J 29/7046; B01J 29/7261; B01J 29/7284; B01J 29/7292; B01J 29/7661; B01J 29/7684; B01J 29/7692; B01J 29/7861; B01J 29/7884; B01J 29/7892; B01J 35/615; B01J 35/613; B01J 35/612
See application file for complete search history.

(56) References Cited

U.S. PATENT DOCUMENTS

2007/0244000 A1   10/2007   Molinier et al.
2010/0261943 A1   10/2010   Van Westrenen et al.

FOREIGN PATENT DOCUMENTS

| CN | 1260823 A | 7/2000 | |
|---|---|---|---|
| CN | 101903086 A | 12/2010 | |
| CN | 106947511 A | 7/2017 | |
| CN | 107774303 A | 3/2018 | |
| CN | 107971026 A | 5/2018 | |
| CN | 108262055 A | 7/2018 | |
| CN | 108970638 A | * 12/2018 | ............ B01J 29/708 |
| EP | 3593901 A1 | 1/2020 | |
| WO | 9857743 A2 | 12/1998 | |

OTHER PUBLICATIONS

Machine translation of CN108970638A, Dec. 11, 2018, pp. 1-17 (Year: 2018).*
Pan et al (CN 107774302, machine translation), published Mar. 3, 2018.*
Pan et al (CN 108568313, machine translation), published Sep. 25, 2018.*
Written Opinion issued on Mar. 6, 2020 for related International Patent Application No. PCT/CN2019/124235 issued by the international searching authority.

(Continued)

*Primary Examiner* — Smita S Patel
(74) *Attorney, Agent, or Firm* — MagStone Law, LLP; Enshan Hong

(57) ABSTRACT

A method for preparing liquid fuel by direct conversion of syngas uses the syngas as reaction raw material and conducts a catalytic conversion reaction on a fixed bed or a moving bed. The catalyst is a composite catalyst formed by compounding component I and component II in a mechanical mixing mode. The active ingredient of the component I is a metal oxide, and the component II is at least one of zeolites with one-dimensional ten-membered ring porous channels; and a weight ratio of the active ingredient in the component I to that in the component II is 0.1-20. The reaction process has high product yield and selectivity. The selectivity for liquid fuel composed of $C_5$-$C_{11}$ can reach 50-80%. The selectivity for aromatic hydrocarbon is less than 40% in $C_5$-$C_{11}$, while the selectivity for methane side product is less than 15%.

14 Claims, No Drawings

(56) References Cited

OTHER PUBLICATIONS

International Search Report issued on Mar. 6, 2020 for related International Patent Application No. PCT/CN2019/124235 issued by the international searching authority.

\* cited by examiner

CATALYST AND METHOD FOR PREPARING LOW AROMATIC HYDROCARBON LIQUID FUEL THROUGH DIRECT CONVERSION OF SYNGAS

RELATED APPLICATIONS

This is a U.S. national stage of international application No. PCT/CN2019/124235 filed on Dec. 10, 2019, which claims priority from China Patent Application No. 201811575053.0 filed on Dec. 21, 2018, the entire content of which is incorporated herein as reference.

TECHNICAL FIELD

The present invention belongs to preparation of liquid fuel through syngas, and in particular relates to a catalyst and a method for preparing liquid fuel through direct conversion of syngas.

BACKGROUND

With the development of the economy and the improvement of living standards, the demands for liquid fuel and chemicals have also been increased sharply year by year. At present, the gasoline is produced mainly by catalytic reforming of heavy naphtha. With the consumption of global oil resources and the high price of crude oil, for countries especially like China with a shortage of oil resources, more than 60% of the consumption of oil relies on imports every year. It has important social significance and strategic significance to seek an alternative technological route to develop and use a method for preparing liquid fuel from non-oil-based carbon resources such as coal, biomass and the like.

China has rich coal resources. The simple technical route of using coal as the raw material, gasifying to obtain synthesis gas (i.e., mixed gas of CO and $H_2$), converting the synthesis gas into methanol, and preparing the methanol into gasoline by dimethyl ether is mature and is already industrialized. The route provides an important new route for preparing liquid fuel by carbon resources such as coal and natural gas. However, if a direct route of direct conversion of syngas is realized without methanol synthesis and methanol dehydration for preparing dimethyl ether, not only the process flow can be simplified, but also unit operation can be reduced, and investment and energy consumption can be reduced. The traditional Fischer-Tropsch path can prepare the liquid fuel through direct conversion of syngas. However, limited by the reaction mechanism, CO and $H_2$ molecules are dissociated and absorbed on the surface of the catalyst to produce surface C atoms and O atoms. The C atoms and the O atoms react with hydrogen absorbed on the surface of the catalyst to form a methylene ($CH_2$) intermediate while releasing water molecules. The $CH_2$ intermediate is freely polymerized on the surface of the catalyst by a migratory insertion reaction to produce hydrocarbon products having different number of carbon atoms (from one to thirty, and sometimes even hundreds of carbon atoms). In the whole reaction, the carbon atoms of the hydrocarbon products are widely distributed, and the selectivity of target products is low. For example, the selectivity of the gasoline is lower than 50%. The bifunctional catalyst composed of oxides and zeolites can be used to separate CO activation from C—C coupling at two active centers, thereby breaking the limitation of product selectivity in the traditional Fischer-Tropsch process and possibly obtaining high gasoline selectivity. However, some zeolites suitable for the synthesis of gasoline fractions, such as the most frequently used ZSM-5 zeolites, are easy to generate aromatic hydrocarbons, causing too high content of the aromatic hydrocarbons in the produced gasoline, which is unfavorable to environmental protection. Therefore, it is urgent to develop a catalyst for preparing gasoline fraction ($C_5$-$C_{11}$) liquid fuel through syngas with high gasoline selectivity, low aromatic hydrocarbon selectivity in gasoline and high activity.

SUMMARY OF THE INVENTION

In view of the above problems, the present invention provides a catalyst and a method for preparing liquid fuel through direct conversion of syngas.

The technical solution of the present invention is:

In one aspect, the present invention provides a bifunctional composite catalyst. The catalyst comprises component I and component II; the component I and the component II are compounded in a mechanical mixing mode; an active ingredient of the component I is a metal oxide; the component II is one or more than one of a zeolite with one-dimensional (1D) ten-membered ring porous channel having TON or AEL or MTT or MRE topology or a metal-modified zeolite with TON or AEL or MTT or MRE topology; the metal oxide is one or more than one of $MnO_x$, $MnCr_yO_{(x+1.5y)}$, $MnAl_yO_{(x+1.5y)}$, $MnZr_yO_{(x+2y)}$, $MnIn_yO_{(x+1.5y)}$, ZnO, $ZnCr_yO_{(1+1.5y)}$, $ZnAl_yO_{(1+1.5y)}$, $ZnGa_yO_{(1+1.5y)}$, $ZnIn_yO_{(2+1.5y)}$, $CeO_2$, $CoAl_yO_{(1+1.5y)}$, $FeAl_yO_{(1+1.5y)}$, $Ga_2O_3$, $Bi_2O_3$, $In_2O_3$, $In_yAl_zMnO_{(x+1.5y+1.5z)}$ and $In_yGa_zMnO_{(x+1.5y+1.5z)}$; the value range of x is 1-3.5; the value range of y is 0.1-10; and the value range of z is 0.1-10.

The specific surface area of the $MnO_x$, ZnO, $CeO_2$, $Ga_2O_3$, $Bi_2O_3$ and $In_2O_3$ is 1-100 m²/g.

The specific surface area of $MnCr_yO_{(x+1.5y)}$, $MnAl_yO_{(x+1.5y)}$, $MnZr_yO_{(x+2y)}$, $MnIn_yO_{(x+1.5y)}$, $ZnCr_yO_{(1+1.5y)}$, $ZnAl_yO_{(1+1.5y)}$, $ZnGa_yO_{(1+1.5y)}$, $ZnIn_yO_{(2+1.5y)}$, $CoAl_yO_{(1+1.5y)}$, $FeAl_yO_{(1+1.5y)}$, $In_yAl_zMnO_{(x+1.5y+1.5z)}$ and $In_yGa_zMnO_{(x+1.5y+1.5z)}$ is 5-150 m²/g.

The zeolite with 1D ten-membered ring porous channel is the zeolite with TON or AEL or MTT or MRE topology; and the zeolite with TON or AEL or MTT or MRE topology has the 1D ten-membered ring porous channel.

Based on the above technical solution, preferably, the zeolite with TON or AEL or MTT or MRE topology contains the 1D ten-membered ring porous channel; the skeleton element composition of the zeolite may be one or more than one of Si—O, Si—Al—O, Si—Al—P—O, Al—P—O, Ga—P—O, Ga—Si—Al—O, Zn—Al—P—O, Mg—Al—P—O and Co—Al—P—O; and this type of zeolite is preferably one or more than one of SAPO-11 or ZSM-22 or ZSM-23 or ZSM-48.

Based on the above technical solution, preferably, the zeolite of the AEL topology has medium-strength acid sites, and the amount of the medium-strength acid sites is 0.05-0.5 mol/kg, preferably 0.05-0.4 mol/kg, and more preferably 0.05-0.3 mol/kg; the zeolite of the TON topology has medium-strength acid sites, and the amount of the medium-strength acid sites is 0.005-0.6 mol/kg, preferably 0.005-0.4 mol/kg, and more preferably 0.005-0.2 mol/kg.

The zeolite in the component II may be a self-synthesized or commercial product which needs to meet the range defined by the present invention.

The acid intensity is defined by $NH_3$-TPD, including three kinds of acid: weak acid, medium-strength acid and strong acid.

The $NH_3$-TPD is the position of a desorption peak according to $NH_3$; the position of the desorption peak means that under standard test conditions that a ratio of sample mass w and carrier gas flow rate f (w/f) is 100 g·h/L and a heating rate is 10° C./min, a TCD records a thermal conductivity signal of desorption of $NH_3$ and draws a desorption curve; according to peaks in positions of curve peaks, the inorganic solid is divided into three acid intensities; the weak acid is an acid site where the deposition temperature of $NH_3$ is less than 275° C.; the medium-strength acid is an acid site where the deposition temperature of $NH_3$ is between 275° C. and 500° C.; and the strong acid is an acid site where the deposition temperature of $NH_3$ is greater than 500° C. The zeolite may be synthesized in the laboratory or purchased commercially which needs to meet the requirements of the present invention.

By using acetone as a probe molecule, the chemical displacement of $^{13}$C-NMR is in the range of 210-220 ppm.

Based on the above technical solution, preferably, a weight ratio of the active ingredient in the component I to the component II is 0.1-20, and preferably 0.3-5.

Based on the above technical solution, preferably, a dispersant is added to the component I, and the metal oxide is dispersed in the dispersant; and the dispersant is one or more than one of $Al_2O_3$, $SiO_2$, $Cr_2O_3$, $ZrO_2$, $TiO_2$, $Ga_2O_3$, activated carbon, graphene, and carbon nanotube.

Based on the above technical solution, preferably, in the component I, the content of the dispersant is 0.05-90 wt %, and the balance is the metal oxide.

Based on the above technical solution, preferably, H can be connected or not connected to O element of the zeolite skeleton in the component II; the H can be entirely or partially replaced by one or more than one of Na, Mg, K, Mn, Ag, Mo, Cr, Fe, Co, Ca, Pt, Pd, Ti, Zn, Ga, Ba and Ge by ion exchange; and the total molar ratio of the substitute metal to oxygen is 0.0002-0.02.

In another aspect, the present invention provides a method for preparing liquid fuel through direct conversion of syngas. The syngas is used as reaction raw material; a conversion reaction is conducted on a fixed bed or a moving bed; and the adopted catalyst is the above bifunctional composite catalyst.

Based on the above technical solution, preferably, the pressure of the syngas is 0.5-10 MPa, and preferably 1-8 MPa; reaction temperature is 300-600° C., and preferably 350° C.-450° C.; space velocity is 300-12000 $h^{-1}$, preferably 1000-9000 $h^{-1}$ and more preferably 3000-9000 $h^{-1}$; the syngas is $H_2$/CO mixture; and the ratio of $H_2$/CO is 0.2-3.5, and preferably 0.3-2.5.

Based on the above technical solution, preferably, the bifunctional composite catalyst is used for preparing liquid fuel through one-step direct conversion of syngas, wherein the selectivity for the liquid fuel can reach 50-80%, and preferably 65-80%; the selectivity for aromatic hydrocarbons in $C_5$-$C_{11}$ is lower than 40%, and preferably less than 30%. Meanwhile, the selectivity for the methane side product is less than 15%, and preferably less than 10%.

The present invention has the following advantages:
1. Different from the traditional Fischer-Tropsch synthesis for preparation of liquid fuel, this technology directly converts the syngas into the liquid fuel efficiently in one step, and simultaneously greatly reduces the selectivity for aromatic hydrocarbons in the liquid fuel.
2. The selectivity for the liquid fuel in the product is as high as 50-80%. The product is separated without deep cooling, thereby greatly reducing separation energy consumption and cost.
3. The active ingredient metal oxide of the component I in the catalyst has a higher specific surface area; therefore, the metal oxide surface has more active sites, which is more conducive to conducting a catalytic reaction.
4. On one hand, the role of the component II in the catalyst is to further convert the active gas-phase intermediate produced by the component I to obtain liquid fuel by coupling with the component I. The role of the component II on the balanced pull of the series reaction can promote the activation and conversion of the component I for the syngas and thus can increase the conversion rate. On the other hand, the special 1D ten-membered ring porous channel structure of the zeolite in the component II used in the present invention has a unique selection effect, can obtain more liquid fuel products with high selectivity and also greatly reduces the content of the aromatic hydrocarbons in the liquid fuel.
5. The functions of the present invention cannot be achieved if the component I or the component II in the present invention is used separately. For example, the selectivity of methane in the product after separate use of the component I is very high, and the conversion rate is very low. The syngas cannot be activated and converted if the component II is used separately. Only the synergistic catalysis of the component I and the component II can achieve efficient conversion of the syngas and obtain excellent selectivity. Because the component I can activate the syngas to generate a specific active gas-phase intermediate, the intermediate diffuses into the porous channel of the component II through the gas phase. Because the zeolite of the TON or AEL or MTT or MRE topology selected in the present invention has special 1D ten-membered ring porous channel structure and acidity, the active gas-phase intermediate produced by the component I can be effectively further activated and converted into the liquid fuel and simultaneously low selectivity (<40%) for the aromatic hydrocarbons can be maintained. The zeolite is different from 1D eight-membered ring and twelve-membered ring, and 2D and 3D ten-membered ring zeolites. The 1D eight-membered ring product mainly includes short carbon chain hydrocarbons. Although long carbon chain products are relatively high in the product obtained by the 1D twelve-membered ring zeolite, the content of aromatic hydrocarbons in the products is higher than that of the 1D ten-membered ring zeolite. Although the 2D and 3D ten-membered ring zeolites can produce more high carbon products, the selectivity for the aromatic hydrocarbons in long chains is high, which is unfavorable to environmental protection requirements. Therefore, the special porous channel structure of the component II enables the product to have special selectivity.
6. The composite catalyst in the patent is simple in preparation process and mild in conditions. The reaction process has an extremely high product yield and selectivity. The selectivity for liquid fuel composed of $C_5$-$C_{11}$ can reach 50-80%. Meanwhile, the selectivity for aromatic hydrocarbons is less than 40% in $C_5$-$C_{11}$, and the selectivity for a methane side product is low (<15%).

DETAILED DESCRIPTION OF PREFERRED EMBODIMENTS

The present invention is further illustrated below through embodiments, but the scope of claims of the present invention is not limited by the embodiments. Meanwhile, the embodiments only give some conditions for achieving the purpose, but it doesn't mean that the conditions must be satisfied to achieve the purpose.

The specific surface area of the sample can be tested through a physical adsorption method of nitrogen or argon.

The metal oxide in the present invention can be obtained by purchasing a commercially available metal oxide with a high specific surface area, or obtained by the following methods:

I. Preparation of Component I of Catalyst (I) Synthesizing ZnO Material with High Specific Surface Area Through a Precipitation Method:

(1) 3 parts of 0.446 g (1.5 mmol) of $Zn(NO_3)_2 \cdot 6H_2O$ were respectively weighed into three containers; 0.795 g (7.5 mmol), 1.272 g (12 mmol) and 1.908 g (18 mmol) of $NaCO_3$ were respectively weighed and successively added to the above three containers; 30 ml of deionized water was weighed and added to the three containers; the mixture was stirred for more than 0.5 h at 70° C. to uniformly mix the solution; and the solution was naturally cooled to room temperature. Reaction liquid was centrifugally separated to collect the centrifugally separated precipitate; and the precipitate was washed with deionized water twice to obtain ZnO metal oxide precursor.

(2) Roasting: after drying the obtained product in the air, the product was roasted in an atmosphere to obtain ZnO material with high specific surface area. The atmosphere is inert gas, reducing gas or oxidizing gas. The inert gas is one or more than one of $N_2$, He and Ar. The reducing gas is one or two of $H_2$ and CO, and the reducing gas may also contain the inert gas. The oxidizing gas is one or more than one of $O_2$, $O_3$ and $NO_2$, and the oxidizing gas may also contain the inert gas. Roasting temperature is 300-700° C., and time is 0.5 h-12 h.

The purpose of roasting is to decompose the precipitated metal oxide precursor into oxide nanoparticles with high specific surface area at high temperature, and clean the adsorbed species on the surface of the oxide generated by decomposition through the high temperature roasting treatment.

Specific samples and preparation conditions thereof are shown in Table 1 below. As a reference example, $ZnO_4$ in the table is a commercially available ZnO single crystal with low specific surface area.

TABLE 1

Preparation of ZnO Material and Parameter Performance

| Zinc Oxide Sample Number | Roasting Time/h | Roasting Temperature/° C. | Roasting Atmosphere | Specific Surface Area $m^2/g$ |
|---|---|---|---|---|
| ZnO 1 | 5 | 500 | Ar | 71 |
| ZnO 2 | 2 | 320 | 5% $H_2/N_2$ | 47 |
| ZnO 3 | 3 | 550 | Air | 15 |
| ZnO 4 | — | — | — | <1 |

(II) Synthesizing MnO Material with High Specific Surface Area Through a Coprecipitation Method:

The preparation process is the same as that of the above $ZnO_2$. The difference is that, the precursor of Zn is changed for the corresponding precursor of Mn, which may be one of manganous nitrate, manganese chloride and manganese acetate, and is manganous nitrate herein. The corresponding product is defined as $MnO_x$; x=1. The specific surface area is 43 $m^2/g$.

(III) Synthesizing $CeO_2$ Material with High Specific Surface Area Through the Coprecipitation Method:

The preparation process is the same as that of the above $ZnO_2$. The difference is that, the precursor of Zn is changed for the corresponding precursor of Ce, which may be one of cerium nitrate, cerium chloride and cerous acetate, and is cerium nitrate herein. The corresponding product is defined as $CeO_2$. The specific surface area is 92 $m^2/g$.

(IV) Synthesizing $Ga_2O_3$ Material with High Specific Surface Area Through a Coprecipitation Method:

The preparation process is the same as that of the above $ZnO_2$. The difference is that, the precursor of Zn is changed for the corresponding precursor of Ga, which may be one of gallium nitrate, gallium chloride and gallium acetate, and is gallium nitrate herein. The corresponding product is defined as $Ga_2O_3$. The specific surface area is 55 $m^2/g$.

(V) Synthesizing $Bi_2O_3$ Material with High Specific Surface Area Through a Coprecipitation Method:

The preparation process is the same as that of the above $ZnO_2$. The difference is that, the precursor of Zn is changed for the corresponding precursor of Bi, which may be one of bismuth nitrate, bismuth chloride and bismuth acetate, and is bismuth nitrate herein. The corresponding product is defined as $Bi_2O_3$. The specific surface area is 87 $m^2/g$.

(VI) Synthesizing $In_2O_3$ Material with High Specific Surface Area Through a Coprecipitation Method:

The preparation process is the same as that of the above $ZnO_2$. The difference is that, the precursor of Zn is changed for the corresponding precursor of In, which may be one of indium nitrate, indium chloride and indium acetate, and is indium nitrate herein. The corresponding product is defined as $In_2O_3$. The specific surface area is 52 $m^2/g$.

(VII) Synthesizing $MnCr_yO_{(x+1.5y)}$, $MnAl_yO_{(x+1.5y)}$, $MnZr_yO_{(x+2y)}$, $MnIn_yO_{(x+1.5y)}$, $ZnCr_yO_{(1+1.5y)}$, $ZnAl_yO_{(1+1.5y)}$, $ZnGa_yO_{(1+1.5y)}$, $ZnIn_yO_{(2+1.5y)}$, $CoAl_yO_{(1+1.5y)}$, $FeAl_yO_{(1+1.5y)}$, $In_yAl_zMnO_{(x+1.5y+1.5z)}$ and $In_yGa/MnO_{(x+1.5y+1.5z)}$ with High Specific Surface Area Through a Precipitation Method:

Zinc nitrate, aluminum nitrate, chromic nitrate, manganese nitrate, zirconium nitrate, gallium nitrate, indium nitrate, cobalt nitrate and ferric nitrate were adopted as precursors, and mixed at room temperature in water (wherein for ammonium carbonate as a precipitant, a feeding ratio is excessive or the ratio of ammonium ions to metal ions is preferably 1:1). The above mixed solution was aged, and then taken out for washing, filtering and drying; and the obtained solid was roasted under an air atmosphere to obtain a metal oxide with high specific surface area. Specific samples and preparation conditions thereof are shown in Table 2 below.

TABLE 2

Preparation of Metal Oxide with High Specific Surface Area and Performance Parameters

| Metal Oxide | Feeding Ratio of Metal Elements and Final Molar Concentration of One Metal in Water, mmol/L | Aging Temperature °C | Aging Time h | Roasting Temperature °C | Roasting Time h | Specific Surface Area m²/g |
|---|---|---|---|---|---|---|
| $ZnCr_yO_{(1+1.5y)}$; y = 2 | ZnCr = 1:2, Zn is 50 mM | 120 | 24 | 500 | 2 | 126 |
| $ZnAl_yO_{(1+1.5y)}$; y = 2 | ZnAl = 1:2, Zn is 50 mM | 130 | 20 | 400 | 4 | 137 |
| $ZnGa_yO_{(1+1.5y)}$; y = 2 | ZnGa = 1:2, Zn is 50 mM | 130 | 20 | 400 | 4 | 110 |
| $ZnIn_yO_{(2+1.5y)}$; y = 2 | ZnIn = 1:2, Zn is 50 mM | 130 | 20 | 400 | 4 | 87 |
| $MnCr_yO_{(x+1.5y)}$; y = 2 | MnCr = 1:2, Mn is 50 mM | 140 | 18 | 450 | 3 | 11 |
| $MnAl_yO_{(1+1.5y)}$; y = 2 | MnAl = 1:2, y = 2; and Mn is 50 mM | 145 | 16 | 400 | 2 | 15 |
| $MnZr_yO_{(x+2y)}$; y = 2 | MnZr = 1:2, Mn is 50 mM | 150 | 12 | 500 | 1 | 38 |
| $MnIn_yO_{(x+1.5y)}$; y = 2 | MnIn = 1:2, Mn is 50 mM | 150 | 12 | 500 | 1 | 67 |
| $CoAl_yO_{(1+1.5y)}$; y = 2 | CoAl = 1:2, Co is 50 mM | 145 | 16 | 400 | 2 | 22 |
| $FeAl_yO_{(1+1.5y)}$; y = 2 | FeAl = 1:2, Fe is 50 mM | 145 | 16 | 400 | 2 | 30 |
| $In_yAl_zMnO_{(x+1.5y+1.5z)}$; x = 1; y = 1; z = 3; | In:Al:Mn = 1:3:1; Mn is 50 mM | 150 | 12 | 500 | 1 | 84 |
| $In_yGa_zMnO_{(x+1.5y+1.5z)}$; x = 1; y = 1; z = 2; | In:Ga:Mn = 1:2:1; Mn is 50 mM | 145 | 16 | 400 | 2 | 67 |

(VIII) Metal Oxide Dispersed in Dispersant $Cr_2O_3$, $Al_2O_3$ or $ZrO_2$ $Cr_2O_3$, $Al_2O_3$ or $ZrO_2$ dispersed metal oxide was prepared through a precipitate deposition method by taking $Cr_2O_3$, $Al_2O_3$ or $ZrO_2$ as a carrier. By taking preparation of dispersed ZnO as an example, commercial $Cr_2O_3$ (the specific surface area is about 5 m²/g), $Al_2O_3$ (the specific surface area is about 20 m2/g) or $ZrO_2$ (the specific surface area is about m2/g) as a carrier was dispersed in water in advance, and then mixed and precipitated at room temperature with a sodium carbonate precipitant by taking zinc nitrate as raw material. The molar concentration of $Zn^{2+}$ is 0.067M; and the ratio of molar fractions of $Zn^{2+}$ and the precipitant is 1:8; and then aging was conducted at 160° C. for 24 hours to obtain dispersed ZnO by taking $Cr_2O_3$, $Al_2O_3$ or $ZrO_2$ as the carrier (the contents of the dispersants in the component I are 0.1 wt %, 20 wt % and 85 wt %). The obtained sample was roasted at 500° C. for 1 hour in air. The products were successively defined as dispersed oxides 1-3, and the specific surface areas are successively 148 m²/g, 115 m²/g and 127 m²/g.

The same method is used to obtain dispersed MnO oxide by taking $SiO_2$ (the specific surface area is about 2 m²/g), $Ga_2O_3$ (the specific surface area is about 10 m²/g), or $TiO_2$ (the specific surface area is about 15 m²/g) as the carrier (the contents of the dispersing agents in the component I are 5 wt %, 30 wt % and 60 wt %). The products are successively defined as dispersed oxides 4-6. The specific surface areas are successively 97 m²/g, 64 m²/g and 56 m²/g.

The same method is used to obtain dispersed ZnO oxide by taking activated carbon (the specific surface area is about 1000 m²/g), graphene (the specific surface area is about 500 m²/g), and carbon nanotube (the specific surface area is about 300 m²/g) as the carrier (the contents of the dispersing agents in the component I are 5 wt %, 30 wt % and 60 wt %). The products are successively defined as dispersed oxides 7-9. The specific surface areas are successively 177 m²/g, 245 m²/g and 307 m²/g.

II. Preparation of Component II (Zeolite with TON or AEL or MTT or MRE Topology)

The zeolite with TON or AEL or MTT or MRE topology has the 1D ten-membered ring porous channel.

The mediate strong acid described in the present invention can be tested by solid nuclear magnetic H spectrum, NH3-TPD, infrared ray and chemical titration. However, the test method of the acidity is not limited to the above test methods.

The zeolite in the present invention may be the zeolite with TON or AEL or MTT or MRE topology having acid density of commodities that satisfies the requirements of the present invention and may also be a self-synthetic zeolite. The present invention takes the zeolite prepared by a hydrothermal synthesis method as an example.

1) A Specific Preparation Process of the Zeolite with AEL Topology is:

The raw materials of 30% (mass concentration) of silica sol, aluminum isopropoxide, phosphoric acid, DPA and/or DIPA(R) and deionized water were weighed according to oxide $SiO_2:Al_2O_3:H_3PO_4:R:H_2O$=4:10:10:9:300 (mass ratio); after mixing at room temperature, 0.5 time of molar weight of auxiliary HF was added to a template agent; the mixture was stirred and aged at 30° C. and then transferred into a hydrothermal reactor after 2 h, and crystallized at 200° C. for 24 h. The water bath was quenched to room temperature. Centrifugal washing was conducted repeatedly so that the pH of the supernatant was 7 at the end of washing. After the precipitate was dried at 110° C. for 17 h, the precipitate was roasted in air at 600° C. for 3 h to obtain the silicon-phosphorus-aluminum inorganic solid acid with hierarchical pore structure.

2) A Specific Preparation Process of the Zeolite with TON Topology is:

The raw materials of 30% (mass concentration) of silica sol, aluminum sulphate, potassium hydroxide, HDA(R) and deionized water were weighed according to oxide $SiO_2$: $Al_2O_3$:$K_2O$:R:$H_2O$=70:1:7.5:25:500 (mass ratio); after mixing at room temperature, 0.5 time of molar weight of auxiliary HF was added to a template agent; the mixture was stirred and aged at 30° C. and then transferred into a hydrothermal reactor after 2 h, and crystallized at 180° C. for 48 h. The water bath was quenched to room temperature. Centrifugal washing was conducted repeatedly so that the pH of the supernatant was 7 at the end of washing. After the precipitate was dried at 110° C. for 17 h, the precipitate was roasted in air at 600° C. for 3 h to obtain the zeolite with hierarchical pore structure.

3) A Specific Preparation Process of the Zeolite with MTT Topology is:

0.4 g of aluminum sulfate was dissolved in 60.75 g of water; and after 0.26 g of NaOH and 2.4 g of pyridine were added, 4.5 g of white carbon black was added. After the mixture was stirred for 2 h, the mixture was transferred into a tetrafluoroethylene-lined hydrothermal reactor and crystallized at 160° C. for 3d. The product was centrifugally washed, dried, and roasted, then subjected to ion exchange with 1M ammonium nitrate solution at 70° C. for 2 h, centrifugally washed again, dried and roasted to obtain the product.

4) A Specific Preparation Process of the Zeolite with MRE Topology is:

$PMBr_2$ was used as the template agent; 0.15 g of aluminum nitrate was dissolved in 17.93 g of water; 0.64 g of 50 wt % sodium hydroxide was added; and 1.24 g of template agent was added. Finally, 4.96 g of TEOS (tetraethyl orthosilicate) was added and stirred for 2 h; and the solution was transferred into a 45 mL hydrothermal kettle and rotationally crystallized for at 160° C. for 7 d at 37 rpm. After quenched, the product was centrifugally washed, dried and roasted. The product was also subjected to ion exchange with 1M ammonium nitrate solution at 70° C. for 2 h, centrifugally washed again, dried and roasted to obtain the product.

The skeleton element composition of the zeolite with TON or AEL or MTT or MRE topology may be one or more than one of Si—O, Si—Al—O, Si—Al—P—O, Al—P—O, Ga—P—O, Ga—Si—Al—O, Zn—Al—P—O, Mg—Al—P—O and Co—Al—P—O. O element of part of the skeleton is connected with H, and corresponding products are successively defined as parts 1-6.

TABLE 3

Preparation of Zeolite with TON or AEL or MTT or MRE Topology and Performance Parameters

| Sample No. | Si Source | Aluminum Source | P Source | Alkali Source | Template Agent | Auxiliary | Mass Ratio | Hydrothermal Temperature (° C.) | Time (Day) | Acid Amount mol/kg |
|---|---|---|---|---|---|---|---|---|---|---|
| Part 1 | TEOS | sodium metaaluminate | phosphoric acid | | DPA | HCl | $SiO_2$:$Al_2O_3$:$H_3PO_4$:R:$H_2O$ = 7:16:32:55:150 | 190 | 2 | 0.44 |
| Part 2 | silica sol | $Al(OH)_3$ | | potassium hydroxide | HDA | | $SiO_2$:$Al_2O_3$:$K_2O$:R:$H_2O$ = 90:1:7.5:25:500 | 170 | 4 | 0.16 |
| Part 3 | TEOS | AlOOH | phosphoric acid | | DIPA&DPA | HF | $SiO_2$:$Al_2O_3$:$H_3PO_4$:R:$H_2O$ = 2:15:32:55:150 | 180 | 6 | 0.24 |
| Part 4 | white carbon black | aluminum sulfate | | sodium hydroxide | pyridine | | $SiO_2$:$Al_2O_3$:$Na_2O$:R:$H_2O$ = 9:1:0.5:5:130 | 160 | 4.5 | 0.37 |
| Part 5 | silica sol | | phosphoric acid | | HDA | HF | $SiO_2$:$Al_2O_3$:$K_2O$:R:$H_2O$ = 10:1:7.5:25:500 | 200 | 2 | 0.49 |
| Part 6 | TEOS | aluminum nitrate | | sodium hydroxide | PMBr2 | | $SiO_2$:$Al_2O_3$:$Na_2O$:R:$H_2O$ = 25:1:1.5:6:90 | 160 | 7 | 0.31 |

2) The H connected to the O element of skeletons of the above products 1-6 is replaced by the following metal ion parts: Na, Mg, K, Mn, Ag, Mo, Cr, Fe, Co, Ca, Pt, Pd, Ti, Zn, Ga, Ba and Ge by ion exchange; and the preparation process is:

$SiO_2$:$Al_2O_3$:$H_3PO_4$:R:$H_2O$=4:16:32:55:150, wherein R is the template agent.

The aluminum sulphate was mixed with the sodium hydroxide solution, and then silica sol, phosphoric acid, DPA and/or DIPA(R), and deionized water were added and stirred for 1 h to obtain initial gel with uniform phase. Then, the mixture was transferred into a synthesis autoclave, statically crystallized at 190° C. for 48 h, and then quenched, washed and dried to obtain a zeolite sample with AEL topology.

$SiO_2$:$Al_2O_3$:$K_2O$:R:$H_2O$=70:1:7.5:25:500, wherein R is the template agent.

The aluminum sulphate was mixed with the potassium hydroxide solution, and then silica sol, HDA(R) and deionized water were added and stirred for 1 h to obtain initial gel with uniform phase. Then, the mixture was transferred into a synthesis autoclave, statically crystallized at 190° C. for 48 h, and then quenched, washed and dried to obtain a zeolite sample with TON topology.

$SiO_2$:$Al_2O_3$:$Na_2O$:R:$H_2O$=9:1:0.5:5:130, wherein R is the template agent.

Aluminum sulphate was dissolved in the water, and then NaOH, pyridine (R) and white carbon black were added. After the mixture was stirred for 2 h, the mixture was transferred into a tetrafluoroethylene-lined hydrothermal reactor, and crystallized at 160° C. for 3d. The product was centrifugally washed, dried and roasted to obtain the zeolite sample product with MTT topology.

$SiO_2$:$Al_2O_3$:$Na_2O$:R:$H_2O$=25:1:1.5:6:90, wherein R is the template agent.

The aluminum nitrate was mixed with the sodium hydroxide solution, and then TEOS, $PMBr_2$(R) and deionized water were added and stirred for 2 h. Then, the mixture was transferred into a synthesis autoclave, statically crystallized at 160° C. for 84 h, and then quenched, washed and dried to obtain a zeolite sample with MRE topology.

The above samples were taken and then mixed with 0.5 mol/L of metal ion nitrate solution to be exchanged according to the solid-liquid mass ratio of 1:30. The mixture was stirred at 80° C. for 6 h, washed, dried twice continuously, and roasted at 550° C. for 3 h to obtain TON or AEL or MTT or MRE after metal ion exchange. Corresponding products are successively defined as parts 7-23.

TABLE 4

Preparation of Zeolite with TON or AEL or MTT or MRE Topology and Performance Parameters

| Sample No. | Ion | Ratio of Metal Ion and O | NH3-part | Aluminum Source | Exchange Temperature (° C.) | Time (hour) | Acid Amount mol/kg |
|---|---|---|---|---|---|---|---|
| Part 7 | Na | 0.0074 | Part 1 | sodium metaaluminate | 80 | 10 | 0.22 |
| Part 8 | Mg | 0.0088 | Part 2 | Al(OH)$_3$ | 90 | 8 | 0.12 |
| Part 9 | K | 0.007 | Part 3 | AlOOH | 80 | 7 | 0.20 |
| Part 10 | Mn | 0.0085 | Part 4 | aluminum isopropoxide | 90 | 5 | 0.21 |
| Part 11 | Ag | 0.0055 | Part 5 | aluminum sulfate | 90 | 7 | 0.31 |
| Part 12 | Mo | 0.006 | Part 6 | sodium metaaluminate | 90 | 7 | 0.23 |
| Part 13 | Cr | 0.0035 | Part 1 | aluminum sulfate | 80 | 8 | 0.41 |
| Part 14 | Fe | 0.008 | Part 2 | aluminum nitrate | 70 | 3 | 0.14 |
| Part 15 | Co | 0.007 | Part 1 | aluminum nitrate | 90 | 8 | 0.28 |
| Part 16 | Ca | 0.0072 | Part 4 | AlOOH | 60 | 6 | 0.25 |
| Part 17 | Pt | 0.0081 | Part 3 | aluminum nitrate | 90 | 5 | 0.18 |
| Part 18 | Pd | 0.006 | Part 4 | aluminum nitrate | 80 | 9 | 0.33 |
| Part 19 | Ti | 0.004 | Part 5 | aluminum nitrate | 90 | 6 | 0.42 |
| Part 20 | Zn | 0.0076 | Part 6 | AlOOH | 70 | 8 | 0.29 |
| Part 21 | Ga | 0.00035 | Part 5 | aluminum nitrate | 80 | 3 | 0.46 |
| Part 22 | Ba | 0.0039 | Part 5 | aluminum nitrate | 90 | 3 | 0.39 |
| Part 23 | Ge | 0.012 | Part 2 | aluminum nitrate | 85 | 3 | 0.08 |

| Sample No. | Precursor 1 | Precursor 2 | Precursor 3 | Template Agent | Auxiliary | Mass Ratio | Hydrothermal Temperature (° C.) | Time (Day) | Acid Amount mol/kg |
|---|---|---|---|---|---|---|---|---|---|
| Part 24 | TEOS | | potassium hydroxide | HDA | HF | SiO$_2$:K$_2$O:R:H$_2$O = 60:7:55:500 | 180 | 2 | 0.006 |
| Part 25 | silica sol | Al(OH)$_3$ | | DPA & DIPA | HF | SiO$_2$:Al$_2$O$_3$:R:H$_2$O = 4.4:19:15:150 | 170 | 4 | 0.15 |
| Part 26 | TEOS | gallium nitrate | sodium hydroxide | PMBr$_2$ | | SiO$_2$:Ga$_2$O$_3$:Na$_2$O:R:H$_2$O = 15:4:2:55:150 | 165 | 2.5 | 0.48 |
| Part 27 | Zinc nitrate | aluminum sulfate | phosphoric acid | DIPA | HF | ZnO:Al$_2$O$_3$:H3PO$_4$:R:H2O = 6.5:16:32:55:150 | 190 | 1 | 0.41 |
| Part 28 | magnesium nitrate | aluminum sulfate | sodium hydroxide | pyridine | | MgO:Al$_2$O$_3$:Na$_2$O:R:H$_2$O = 17:2:32:55:150 | 170 | 1 | 0.37 |
| Part 29 | potassium nitrate | aluminum sulfate | phosphoric acid | HDA | HF | SiO$_2$:Al$_2$O$_3$:H$_3$PO$_4$:R:H$_2$O = 7.4:18:32:55:150 | 200 | 2 | 0.58 |

3) Zeolite composed of other elements

III. Catalyst Preparation

The component I and the component II in the required ratio were added to the container to achieve the purposes of separation, crushing, uniform mixing and the like through one or more than one of extrusion force, impact force, shear force and friction force generated by high-speed motion of the material and/or the container, so as to realize conversion of mechanical energy, thermal energy and chemical energy by regulating the temperature and the atmosphere of carrier gas, thereby further regulating the interaction between different components.

In the mechanical mixing process, the mixing temperature can be set as 20-100° C., and the mechanical mixing process can be conducted in an atmosphere or directly in the air. The atmosphere is selected from any of the following gas:

a) nitrogen and/or inert gas;
b) mixed gas of hydrogen, nitrogen and/or inert gas, with the volume of hydrogen in the mixed gas being 5-50%;
c) mixed gas of CO, nitrogen and/or inert gas, with the volume of CO in the mixed gas being 5-20%;
d) mixed gas of $O_2$, nitrogen and/or inert gas, with the volume of $O_2$ in the mixed gas being 5-20%, wherein the inert gas is one or more than one of helium, argon and neon.

The mechanical mixing can adopt one or more than one of mechanical agitation, ball milling, rocking bed mixing and mechanical grinding for composition. Specifically:

Mechanical stirring: mixing the component I and the component II with a stirring rod in a stirring tank; and regulating the mixing degree and the relative distance of the component I and the component II by controlling stirring time (5 min-120 min) and rate (30-300 r/min).

Ball milling: rolling at high speed in a grinding tank by using abrasive and the catalysts; and producing strong impact and milling on the catalysts to achieve the effects of dispersing and mixing the component I and the component II. The ratio of the abrasive (which may be stainless steel, agate and quartz; and the size range is 5 mm-15 mm) to the catalysts (the mass ratio scope is 20-100:1) is controlled to regulate the particle size and the relative distance of the catalysts.

Shaking table mixing: premixing the component I and the component II and placing the components into the container; realizing the mixing of the component I and the component II by controlling the reciprocating oscillation or circumferential oscillation of a shaking table; and realizing uniform mixing and regulating the relative distance by regulating oscillation speed (range: 1-70 r/min) and time (range: 5 min-120 min).

Mechanical grinding: premixing the component I and the component II and placing the components into the container; and under certain pressure (range: 5 kg-20 kg), making relative motion (speed range: 30-300 r/min) by the ground and mixed catalysts to achieve the effects of regulating the particle size and the relative distance of the catalysts and realizing uniform mixing.

Specific catalyst preparation and parameter features are shown in Table 6.

TABLE 6

Preparation of Catalysts and Parameter Features

| | | | | Compounding Mode and Condition | | | |
|---|---|---|---|---|---|---|---|
| Catalyst No. | Catalyst Component I | Catalyst Component II | Weight Ratio of I to II | Mechanical Agitation Rate (r/min) and Time (min) | Ball Milling Abrasive Material, Size Range and Catalyst Mass Ratio | Rocking Bed Oscillation Speed (r/min) and Time (min) | Mechanical Polishing Pressure (kg) and Relative Movement Rate (r/min) |
| A | ZnO 1 | Part 1 | 0.33 | 5, 30 | | | |
| B | ZnO 2 | Part 2 | 0.5 | 100, 250 | | | |
| C | ZnO 3 | Part 3 | 2 | | 5 mm stainless steel ball, 50:1 | | |
| D | $MnO_x$; x = 1 | Part 4 | 1 | | 6 mm stainless steel ball, 60:1 | | |
| E | $CeO_2$ | Part 5 | 1 | | | 5, 10 | |
| F | $Bi_2O_3$ | Part 6 | 3 | | | 60, 100 | |
| G | $In_2O_3$ | Part 7 | 3 | | | | 5, 30 |
| H | $TiO_2$ | Part 8 | 1 | 100, 300 | | | |
| I | $ZnCr_yO_{(1+1.5y)}$; y = 2 | part 9 + part 10 (mass ratio 1:1) | 5 | | 6 mm agate ball, 100:1 | | |
| J | $ZnAl_yO_{(1+1.5y)}$; y = 2 | Part 10 | 1 | | | 70, 100 | |
| K | $ZnGa_yO_{(1+1.5y)}$; y = 2 | Part 11 | 3 | | | | 15, 200 |
| L | $ZnIn_yO_{(2+1.5y)}$; y = 2 | part 12 + part 13 + part 14 (mass ratio 1:1:1) | 0.33 | | | | 20, 300 |
| M | $MnCr_yO_{(x+1.5y)}$; y = 2 | Part 13 | 1 | 100, 300 | | | |
| N | composite metal ZnCo, the molar ratio of Zn to Co is 1:1. | Part 14 | 3 | | 6 mm quartz, 100:1 | | |
| O | $MnZr_yO_{(x+2y)}$; y = 2 | Part 15 | 0.33 | | 6 mm quartz, 100:1 | | |
| P | $MnIn_yO_{(x+1.5y)}$; y = 2 | Part 16 | 1 | | | | 10, 100 |
| Q | $CoAl_yO_{(1+1.5y)}$; y = 2 | Part 17 | 1 | 100, 250 | | | |

TABLE 6-continued

Preparation of Catalysts and Parameter Features

| | | | | Compounding Mode and Condition | | | |
|---|---|---|---|---|---|---|---|
| Catalyst No. | Catalyst Component I | Catalyst Component II | Weight Ratio of I to II | Mechanical Agitation Rate (r/min) and Time (min) | Ball Milling Abrasive Material, Size Range and Catalyst Mass Ratio | Rocking Bed Oscillation Speed (r/min) and Time (min) | Mechanical Polishing Pressure (kg) and Relative Movement Rate (r/min) |
| R | $FeAl_yO_{(1+1.5y)}$; y = 2 | Part 18 | 3 | | 5 mm stainless steel ball, 50:1 | | |
| S | $In_yAl_zMnO_{(x+1.5y+1.5z)}$; x = 1; y = 1; z = 3; | Part 19 | 1 | | | | 10, 100 |
| T | $In_yGa_zMnO_{(x+1.5y+1.5z)}$; x = 1; y = 1; z = 2; | Part 20 | 4 | | | 50, 60 | |
| U | dispersed oxide 1 | Part 21 | 3 | | | | 10, 100 |
| V | dispersed oxide 2 | Part 22 | 20 | | 5 mm stainless steel ball, 100:1 | | |
| W | dispersed oxide 3 | Part 23 | 0.5 | 5, 30 | | | |
| X | dispersed oxide 4 | Part 24 | 1 | 100, 250 | | | |
| Y | dispersed oxide 5 | Part 25 | 3 | | 5 mm stainless steel ball, 50:1 | | |
| Z | dispersed oxide 6 | Part 26 | 1.5 | | 6 mm stainless steel ball, 60:1 | | |
| Z1 | dispersed oxide 7 | Part 27 | 2.5 | | | 5, 10 | |
| Z2 | dispersed oxide 8 | Part 28 | 1.5 | | | 60, 100 | |
| Z3 | $ZnO_1$ + dispersed oxide 9 (mass ratio 1:5) | Part 29 | 2 | | | | 5, 30 |
| Reference example 1 | ZnO 3 | Commercially available MOR | 3 | | | 20, 30 | |
| Reference example 2 | $MnAl_yO_{(x+1.5y)}$; y = 2 | Commercially available ZSM-12 | 2 | | 5 mm stainless steel ball, 50:1 | | |
| Reference example 3 | $ZnAl_yO_{(1+1.5y)}$; y = 2 | Nankai SAPO-34 | 2 | | 5 mm stainless steel ball, 50:1 | | |
| Reference example 4 | $Ga_2O_3$ | Nankai ZSM-5 | 2 | | 5 mm stainless steel ball, 50:1 | | |
| Reference example 5 | ZnO 1 | Shentan ZSM-35 | 2 | | | 100, 300 | |
| Reference example 6 | $ZnO2 + CeO_2$ (mass ratio 3:1) | Commercially available MCM-22 | 2 | | | | 10, 50 |
| Reference example 7 | $ZnIn_yO_{(x+1.5y)}$; y = 2 | Commercially available ZSM-11 | 1 | 5, 50 | | | |
| Reference example 8 | ZnO 4 | Part 1 | 2 | | | 50, 200 | |

Example of Catalytic Reactions

A fixed bed reaction is taken as an example, but the catalyst is also applicable to a fluidized bed reactor. The apparatus is equipped with gas mass flow meters and online product analysis chromatography (the tail gas of the reactor is directly connected with the metering valve of chromatography, and thus periodic and real-time sampling and analysis will be achieved).

2 g of the above catalyst in the present invention was placed in a fixed bed reactor. The air in the reactor was replaced with Ar; and then the temperature was raised to 300° C. in the $H_2$ atmosphere, and then the syngas ($H_2$/CO molar ratio=0.2-3.5) was switched. The pressure of the syngas was 0.5-10 MPa. The temperature was raised to reaction temperature of 300-600° C., and the air velocity of the reaction raw gas was regulated to 300-12000 ml/g/h. On-line chromatography was used to detect and analyze the product.

The reaction performance can be changed by changing the temperature, pressure, space velocity and $H_2$/CO molar ratio in the syngas. The selectivity for the liquid fuel composed of $C_5$-$C_{11}$ can reach 50-80%. Because the hydrogenation activity of the surface of the metal composite of the catalysts is not high, mass production of methane is avoided. The selectivity for the methane is low. Table 7 lists specific application and effect data of the catalysts.

TABLE 7

Specific Application and Effect Data of Catalysts

| Embodiments | Catalysts | GHSV($h^{-1}$) | Temperature (° C.) | $H_2$/CO Molar Ratio | Pressure (MPa) | CO Conversion Rate % | $C_5$-$C_{11}$ Selectivity % | $CH_4$ Selectivity % | Aromatic Hydrocarbon Selectivity % in $C_5$-$C_{11}$ |
|---|---|---|---|---|---|---|---|---|---|
| 1 | A | 3000 | 400 | 2.5 | 5 | 26.6 | 56.8 | 6.5 | 8.2 |
| 2 | B | 4000 | 410 | 1.5 | 9 | 29.2 | 76.0 | 5.4 | 30.4 |
| 3 | C | 4000 | 380 | 3 | 2.5 | 23.1 | 74.4 | 8.2 | 22.8 |
| 4 | D | 7000 | 420 | 1 | 10 | 18.8 | 69.7 | 3.9 | 24.4 |
| 5 | E | 2000 | 390 | 3.5 | 6 | 20.0 | 61.6 | 7.2 | 17.2 |
| 6 | F | 2000 | 410 | 1.5 | 3 | 22.1 | 70.1 | 6.2 | 30.6 |
| 7 | G | 3500 | 390 | 3.5 | 2.5 | 18.4 | 72.3 | 11.6 | 23.6 |
| 8 | H | 1500 | 370 | 2.5 | 5 | 25.6 | 78.1 | 12.5 | 28.8 |
| 9 | I | 2500 | 380 | 3 | 3.5 | 42.5 | 74.6 | 8.3 | 37 |
| 10 | J | 2000 | 410 | 2.5 | 8 | 40.2 | 73.8 | 3.8 | 30.8 |
| 11 | K | 2000 | 400 | 2.5 | 3 | 41.3 | 66.3 | 5.1 | 20.4 |
| 12 | L | 10500 | 520 | 0.5 | 1 | 40.6 | 73.5 | 6.2 | 29.2 |
| 13 | M | 3000 | 480 | 0.5 | 2 | 45.7 | 71.4 | 4.9 | 21.4 |
| 14 | N | 3000 | 470 | 0.5 | 2 | 50.5 | 77.8 | 14.4 | 33.6 |
| 15 | O | 3000 | 450 | 1 | 3 | 30.1 | 75.9 | 12.2 | 37 |
| 16 | P | 3000 | 450 | 1.5 | 3 | 33.5 | 75.7 | 4.8 | 19 |
| 17 | Q | 3000 | 350 | 3.5 | 5 | 40.1 | 76.2 | 14.6 | 23.4 |
| 18 | R | 2000 | 350 | 3 | 7 | 68.6 | 59.3 | 14.9 | 21.2 |
| 19 | S | 2500 | 400 | 1 | 6 | 42.0 | 56.8 | 13.7 | 14.2 |
| 20 | T | 4000 | 400 | 2 | 4 | 40.1 | 74.2 | 2.5 | 22.6 |
| 21 | U | 3000 | 400 | 3 | 3 | 43.1 | 54.5 | 3.1 | 10.6 |
| 22 | V | 8000 | 450 | 0.5 | 2 | 37.1 | 70.0 | 3.3 | 31 |
| 23 | W | 2000 | 410 | 2 | 3.5 | 38.7 | 78.3 | 7.9 | 38.4 |
| 24 | X | 3000 | 380 | 3.5 | 6 | 40.6 | 80.0 | 2.1 | 38.8 |
| 25 | Y | 5000 | 390 | 3 | 2.5 | 36.7 | 74.9 | 1.9 | 27.2 |
| 26 | Z | 4000 | 370 | 2 | 10 | 43.2 | 56.7 | 14.9 | 20.6 |
| 27 | Z 1 | 10000 | 470 | 1 | 1.5 | 48.7 | 62.1 | 5.8 | 16.2 |
| 28 | Z 2 | 2000 | 400 | 3.5 | 7 | 44.8 | 66.7 | 3.3 | 20 |
| 29 | Z 3 | 3000 | 380 | 1.5 | 2.5 | 47.8 | 50.3 | 4.2 | 14.2 |
| 30 | Reference example 1 | 3000 | 320 | 0.5 | 1 | 15.2 | 21.0 | 3.7 | 6.2 |
| 31 | Reference example 2 | 2000 | 410 | 1.5 | 3 | 35.6 | 65.2 | 3.7 | 45.2 |
| 32 | Reference example 3 | 3000 | 400 | 2 | 3.5 | 35.2 | 9.5 | 1.9 | 2.7 |
| 33 | Reference example 4 | 3000 | 450 | 2.5 | 4 | 25.3 | 79.5 | 3.1 | 70.7 |
| 34 | Reference example 5 | 2200 | 450 | 3 | 2 | 28.0 | 16.2 | 20.1 | 25.1 |
| 35 | Reference example 6 | 1000 | 420 | 2.5 | 4 | 30.3 | 65.1 | 1.5 | 50.5 |
| 36 | Reference example 7 | 2000 | 350 | 3 | 2 | 37.2 | 67.2 | 3.2 | 60.5 |
| 37 | Reference example 8 | 2500 | 380 | 2 | 4 | 0.6 | 61.2 | 5.2 | 25.1 |
| 38 | Reference example 9 | 3000 | 450 | 2.5 | 4 | 5.3 | 1.5 | 73.1 | 0.7 |
| 39 | Reference example 10 | 2200 | 450 | 3 | 2 | <1 | — | — | — |

In reference example 1, the catalyst component A is ZnO 3, and component B is MOR sold by Shentan Company and has 1D eight-membered ring and twelve-membered ring coexistence porous channels.

The zeolite in the catalyst adopted in reference example 2 is a commercially available commodity ZSM-12 which has 1D twelve-membered ring straight porous channels.

The zeolite in the catalyst adopted in reference example 3 is a commercially available commodity SAPO-34 which has 3D cross porous channels and eight-membered ring orifice diameter.

The zeolite in the catalyst adopted in reference example 4 is a commercially available commodity ZSM-5 which has 3D ten-membered ring topology.

The zeolite in the catalyst adopted in reference example 5 is a commercially available commodity ZSM-35 which has 2D eight-membered ring and ten-membered ring coexistence topology.

The zeolite in the catalyst adopted in reference example 6 is a commercially available commodity MCM-22 which has 2D ten-membered ring topology.

The zeolite in the catalyst adopted in reference example 7 is a commercially available commodity ZSM-11 which has 3D ten-membered ring topology.

Reaction results of reference examples 1-7 show that, the zeolites with different topologies are apparent to the selective modulation of the products. The products of the commercially available MOR zeolites with 1D eight-membered ring and twelve-membered ring coexistence mainly include short carbon chain hydrocarbons ($C_2$-$C_4$); and the selectivity for long chain products is relatively low. Although the gasoline selectivity in the product of the ZSM-12 having 1D twelve-membered ring is also relatively high, the content of the aromatic hydrocarbons in the gasoline is high (>40%). The ZSM-35 with 2D eight-membered ring and ten-membered ring coexistence and the SAPO-34 with 3D eight-membered ring porous channel structure are unfavorable to the generation of hydrocarbons above $C_5$, and suitable for the generation of short carbon chain hydrocarbon products. Although the MCM-22 with 2D ten-membered ring and the ZSM-5 and ZSM-11 zeolites with 3D ten-membered ring porous channels are suitable for the generation of the gasoline fractions, the selectivity for the aromatic hydrocarbons in the gasoline is high (>50%). Only the zeolite with TON or AEL or MTT or MRE topology and 1D ten-membered ring porous channel is suitable for the generation of the gasoline with low aromatic hydrocarbon content.

In reference example 8, the catalyst component I is $ZnO_4$, and the specific surface area is low (<1 $m^2/g$); the component II is part 1, the CO conversion rate is low and the reaction activity is low. Therefore, the specific surface area of the oxide is too small, which is unfavorable for the reaction.

The catalyst adopted in reference example 9 is a sample containing only component I $ZnO_1$ without the zeolite with TON or AEL or MTT or MRE topology, and the reaction conversion rate is very low. The products mainly comprise by-products such as dimethyl ether and methane, and almost no liquid fuel is produced.

The catalyst adopted in reference example 10 is a sample containing only component II zeolite without the component I, and the catalytic reaction almost has no activity.

Reference examples 9 and 10 indicate that reaction effects are extremely poor when only component I or component II exists, and do not have the excellent reaction performance in the present invention.

It is observed from the above table that the structure of the zeolite including the TON & AEL & MTT & MRE topologies, acid strength and acid amount, and the matching between the metal oxide and the zeolite are crucial and directly affect the conversion rate of carbon monoxide and selectivity for the liquid fuel.

The invention claimed is:

1. A catalyst, wherein the catalyst comprises a component I and a component II; the component I and the component II are compounded in a mechanical mixing mode; an active ingredient of the component I is a metal oxide; the component II is a zeolite with one-dimensional ten-membered ring porous channel; the metal oxide is at least one of $MnO_x$, $MnCr_yO_{(x+1.5y)}$, $MnAl_yO_{(x+1.5y)}$, $MnZr_yO_{(x+2y)}$, $MnIn_yO_{(x+1.5y)}$, $ZnO$, $ZnCr_yO_{(1+1.5y)}$, $ZnAl_yO_{(1+1.5y)}$, $ZnGa_yO_{(1+1.5y)}$, $ZnIn_yO_{(2+1.5y)}$, $CeO_2$, $CoAl_yO_{(1+1.5y)}$, $FeAl_yO_{(1+1.5y)}$, $Ga_2O_3$, $Bi_2O_3$, $In_2O_3$, $In_yAl_zMnO_{(x+1.5y+1.5z)}$, and $In_yGa_zMnO_{(x+1.5y+1.5z)}$; a value range of x is 1-3.5; a value range of y is 0.1-10; and a value range of z is 0.1-10;

a specific surface area of $MnO_x$, $ZnO$, $CeO_2$, $Ga_2O_3$, $Bi_2O_3$, and $In_2O_3$ is 1-100 $m^2/g$;

a specific surface area of $MnCr_yO_{(x+1.5y)}$, $MnAl_yO_{(x+1.5y)}$, $MnZr_yO_{(x+2y)}$, $MnIn_yO_{(x+1.5y)}$, $ZnCr_yO_{(1+1.5y)}$, $ZnAl_yO_{(1+1.5y)}$, $ZnGa_yO_{(1+1.5y)}$, $ZnIn_yO_{(2+1.5y)}$, $CoAl_yO_{(1+1.5y)}$, $FeAl_yO_{(1+1.5y)}$, $In_yAl_zMnO_{(x+1.5y+1.5z)}$, and $In_yGa_zMnO_{(x+1.5y+1.5z)}$ is 5-150 $m^2/g$;

wherein the zeolite has a topology structure of TON or AEL or MTT or MRE, and a skeleton element composition of the zeolite is at least one of Si—O, Si—Al—O, Si—Al—P—O, Al—P—O, Ga—P—O, Ga—Si—Al—O, Zn—Al—P—O, Mg—Al—P—O, and Co—Al—P—O;

wherein the zeolite of the AEL topology has 0.05-0.5 mol/kg medium-strength acid sites; the zeolite of each of the TON, MTT, and MRE topology has 0.005-0.6 mol/kg medium-strength acid sites:

wherein a peak temperature range corresponding to the desorption peak of $NH_3$-TPD (temperature programmed desorption) for medium-strength acid is 200-500° C.; and by using acetone as a probe molecule, a chemical displacement of $^{13}$C-NMR is in a range of 210-220 ppm.

2. The catalyst according to claim 1, wherein a weight ratio of the active ingredient in the component I to the component II is 0.1-20.

3. The catalyst according to claim 1, wherein the component I further comprises a dispersant; and the dispersant is at least one of $Al_2O_3$, $SiO_2$, $Cr_2O_3$, $ZrO_2$, $TiO_2$, $Ga_2O_3$, activated carbon, graphene and carbon nanotube.

4. The catalyst according to claim 3, wherein in the component I, an amount of the dispersant is 0.05-90 wt. %, and the balance is the metal oxide.

5. The catalyst according to claim 1, wherein H is connected or not connected to O element of the zeolite skeleton; the H is entirely or partially replaced by at least one of Na, Mg, K, Mn, Ag, Mo, Cr, Fe, Co, Ca, Pt, Pd, Ti, Zn, Ga, Ba, and Ge by ion exchange; and the total molar ratio of the substitute metal to oxygen is 0.0002-0.02.

6. The catalyst according to claim 1, wherein the zeolite with one-dimensional ten-membered ring porous channel is at least one of SAPO-11, ZSM-22, ZSM-23, and ZSM-48.

7. The catalyst according to claim 1, wherein a weight ratio of the active ingredient in the component I to the component II is 0.3-5.

8. The catalyst according to claim 1, wherein the zeolite of the AEL topology has 0.05-0.4 mol/kg medium-strength acid sites, and the zeolite of each of the TON, MTT, and MRE topology has 0.005-0.4 mol/kg medium-strength acid sites.

9. The catalyst according to claim 1, wherein the zeolite of the AEL topology has 0.05-0.3 mol/kg medium-strength acid sites, and the zeolite of each of the TON, MTT, and MRE topology has 0.005-0.2 mol/kg medium-strength acid sites.

10. A method for preparing a liquid fuel through direct conversion of a syngas comprising subjecting the syngas to a conversion reaction on a fixed bed or a moving bed in the a presence of the catalyst of claim 1.

11. The method according to claim 10, wherein the conversion reaction is conducted at a pressure of the syngas of 0.5-10 MPa; a reaction temperature of 300-600° C.; a space velocity of 300-12000 h$^{-1}$, and wherein the syngas is H$_2$/CO mixture with a ratio of H$_2$/CO of 0.2-3.5.

12. The method according to claim 10, wherein the method uses the syngas as the a reaction raw material to prepare the liquid fuel through one-step direct conversion; wherein a selectivity for the liquid fuel is 50-80%, and a selectivity for aromatic hydrocarbon is less than 40% in C$_5$-C$_{11}$, while a selectivity for methane side product is less than 15%.

13. The method according to claim 10, wherein the conversion reaction is conducted at a pressure of the syngas of 1-8 MPa, a reaction temperature of 320° C.-450° C., a space velocity of 1000-9000 h$^{-1}$, and wherein the syngas is H$_2$/CO mixture with a ratio of H$_2$/CO of 0.3-2.5.

14. The method according to claim 10, wherein the conversion reaction is conducted at a space velocity of 3000-9000 h$^{-1}$.

* * * * *